(12) United States Patent
Mikkelsen et al.

(10) Patent No.: US 6,539,462 B1
(45) Date of Patent: Mar. 25, 2003

(54) REMOTE DATA COPY USING A PROSPECTIVE SUSPEND COMMAND

(75) Inventors: Claus William Mikkelsen, San Jose, CA (US); William David Davenport, San Jose, CA (US); Michael John Dutch, Satatoga, CA (US); Cynthia Anne Martinage, Mahwah, NJ (US); Richard Allan Ruehle, Reno, NV (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 0 days.

(21) Appl. No.: 09/352,549

(22) Filed: Jul. 12, 1999

(51) Int. Cl.[7] ............................................... G06F 12/00
(52) U.S. Cl. ...................... 711/162; 711/112; 707/204; 712/229; 714/6; 714/20
(58) Field of Search ............................... 711/4, 112, 114, 711/154, 162; 712/229; 707/204, 202; 714/1, 6, 18, 13, 20

(56) References Cited

U.S. PATENT DOCUMENTS

| 5,051,887 | A |   | 9/1991  | Berger et al. ............... 711/162 |
|-----------|---|---|---------|--------------------------------------|
| 5,155,845 | A |   | 10/1992 | Beal et al. ..................... 714/6 |
| 5,241,669 | A |   | 8/1993  | Cohn et al. .................... 714/1 |
| 5,241,670 | A |   | 8/1993  | Eastridge et al. ............... 714/1 |
| 5,263,154 | A |   | 11/1993 | Eastridge et al. ............... 714/6 |
| 5,375,232 | A |   | 12/1994 | Legvold et al. ............. 711/162 |
| 5,404,508 | A |   | 4/1995  | Konrad et al. ............... 707/202 |
| 5,446,871 | A |   | 8/1995  | Shomler et al. ................ 714/1 |
| 5,448,718 | A |   | 9/1995  | Cohn et al. .................... 711/4 |
| 5,488,731 | A |   | 1/1996  | Mendelsohn ................. 711/114 |
| 5,497,483 | A |   | 3/1996  | Beardsley et al. .............. 714/1 |
| 5,504,861 | A | * | 4/1996  | Crockett et al. ............... 714/13 |
| 5,504,883 | A | * | 4/1996  | Coverston et al. .......... 707/202 |
| 5,544,347 | A |   | 8/1996  | Yanai et al. ................. 711/162 |
| 5,555,371 | A |   | 9/1996  | Duyanovich et al. ......... 714/13 |
| 5,574,950 | A |   | 11/1996 | Hathorn ......................... 710/8 |
| 5,577,222 | A |   | 11/1996 | Micka et al. ................ 711/112 |
| 5,579,474 | A | * | 11/1996 | Kakuta et al. .................. 714/6 |
| 5,615,329 | A |   | 3/1997  | Kern et al. ..................... 714/6 |
| 5,623,599 | A |   | 4/1997  | Shomler ....................... 714/18 |
| 5,657,440 | A |   | 8/1997  | Micka et al. ................. 714/16 |
| 5,692,155 | A | * | 11/1997 | Iskiyan et al. .............. 711/162 |
| 5,720,029 | A |   | 2/1998  | Kern et al. .................... 714/20 |
| 5,734,818 | A | * | 3/1998  | Kern et al. .................... 714/20 |
| 5,742,792 | A |   | 4/1998  | Yanai et al. ................. 711/162 |
| 6,301,643 | B1| * | 10/2001 | Crockett et al. ............ 711/111 |

OTHER PUBLICATIONS

Mikkelsen, Claus, "Disaster Recovery Using Real–Time Disk Data Copy," *Enterprise Systems Journal*, Nov. 1998, pp. 34–39.

* cited by examiner

Primary Examiner—Reginald G. Bragdon
Assistant Examiner—Pierre M. Vital
(74) Attorney, Agent, or Firm—David N. Lathrop, Esq.; Gallagher & Lathrop

(57) ABSTRACT

In a computer system, the controller of one or more primary data recording devices sends update information to the controller of one or more secondary data recording devices to maintain a remote copy of data stored on the primary data recording devices. The primary controller receives a command from a computer that specifies a prospective suspend time after which remote copy operation is to be suspended. After the suspend time passes, the primary controller stops sending the update information to the secondary controller and begins storing indicators of the updated information in cache memory. The primary controller may resume remote copy operation in response to a command received from the computer by first entering into a pending mode of operation in which cached indicators are used to identify update information that must be sent to the secondary controller to resynchronize the remote copy. When the information for all cached indicators has been sent, normal remote copy operation may be resumed.

8 Claims, 6 Drawing Sheets

REMOTE DATA COPY USING A PROSPECTIVE SUSPEND COMMAND

TECHNICAL FIELD

The present invention pertains generally to the management of information stored in computer systems, and pertains more specifically to improving the availability of applications during normal operation and to reducing the time required to restore application processing after a disaster or other abnormal event.

BACKGROUND ART

A. Availability and Disaster Recovery

Industry and commerce have become so dependent on computer systems with online or interactive applications that an interruption of only a few minutes in the availability of those applications can have serious financial consequences. Outages of more than a few hours can sometimes threaten a company's or an institution's existence. In some cases, regulatory requirements can impose fines or other penalties for disruptions or delays in services that are caused by application outages.

As a consequence of this growing intolerance for application outages, there is a keen interest in improving the availability of these applications during normal operations and in decreasing the amount of time needed to recover from equipment failure or other disastrous situations.

Unfortunately, some interruption in availability during normal operation is unavoidable because information-updating activities caused by application processing must be quiesced to backup and maintain pertinent data files and databases. Although the computer system itself may be operating and available, the application is not fully available while information-updating activities are quiesced. Backup techniques such as "time zero copy" or "time one copy" operations are known that permit application processing to continue during the bulk of the backup or maintenance task, but these techniques still require the application to be quiesced at least briefly at some point in time such as at the start or at the end of the backup or maintenance operation.

Unlike these brief interruptions in normal operations, longer-duration outages caused by disasters such as equipment or software failure, fire, flood, earthquake, airplane crashes, terrorist or vandal activities can, in principle, be avoided. Realistically, these outages cannot be avoided but the probability of an extended outage can be reduced to an arbitrarily small value by implementing complex systems of geographically dispersed components with redundant features that have no single point of failure. Generally, however, the cost of such systems is prohibitive and some risk of an extended outage must be accepted.

The exposure to an extended outage can be mitigated by providing some type of disaster-recovery mechanism that is able to take whatever remains after the disaster and provide a system with access to all necessary applications. Each disaster-recovery mechanism may be designed to meet either or both of two recovery objectives: (1) a recovery-time objective (RTO) that states the maximum acceptable time required to resume operation, and (2) a recovery-point objective (RPO) that states the maximum amount of time by which the data provided by the recovered system is behind the data that was in the first system at the instant it was damaged or destroyed. The RTO represents the wait that is acceptable to resume operation. The RPO represents the amount of work or the number of transactions that is acceptable to bring the recovered system forward to the situation that existed at the time of the disaster.

The RTO is becoming increasingly critical. Many applications require a recovery time that is less than one hour. The RPO could be as little as a few seconds but for many applications it is not the critical requirement. A few minutes or even hours may be acceptable if the recovery time is low enough. Of course, there is a desire to achieve the RTO and RPO at the lowest possible cost.

B. Data Copy

1. General Considerations

Conventional offline-backup techniques that copy information from data files and databases to offline storage such as tape are not suitable for many applications because: (1) applications must be quiesced for extended periods of time while the backup copy is made, (2) the time needed to restore a data file or database from the offline backup copy onto online storage cannot meet a required RTO, and (3) the contents of the offline backup copy are too old to meet a required RPO.

A number of online-copy techniques are more suitable for improving the availability of applications and for reducing the time required to recover from a disaster or other abnormal event. These online techniques are known by a variety of names and differ in a number of respects, but they are similar in that they all copy information that is stored on one or more primary data recording devices onto one or more secondary data recording devices.

All of these techniques attempt to obtain on the secondary data recording devices a "consistent" copy of the information recorded on the primary data recording devices. A copy of the information that is recorded on the secondary data recording devices is said to be consistent if it represents the exact state of the information that is or was recorded on the counterpart primary data recording devices at some point in time.

For example, suppose that a sequence of two write commands update an indexed database stored on one or more primary data recording devices. The first write command writes a data record. The second write command writes a counterpart index record that refers to the newly written data record. A "consistent" copy may represent the information stored on the primary data recording devices at any of the following three points in time: (1) before data and index records are written, (2) after the data record is written but before the index record is written, or (3) after the data and index records are written. If a copy of the information recorded on the secondary data recording device included the index record but omitted the newly written data record, that copy would not be consistent. Another examples of a write command sequence that occurs in a prescribed order is the creation of a new file or dataset with a subsequent update of a device file allocation table or volume table of contents.

If the information recorded on secondary data recording devices is not consistent, its value for recovery purposes is severely impaired because it contains corrupted information that cannot be easily identified and corrected.

If the information recorded on secondary data recording devices is consistent, it may be used to recover the information that was stored on the counterpart primary data recording devices but some processing may be required to back out incomplete transactions. A consistent copy of information may include information that reflects a partial set of updates from one or more incomplete transactions. For example, a consistent copy of a financial database may reflect the state of information that resulted from an inflight transaction transferring money between two accounts; the consistent copy may show the amount has been debited from the source account but not yet credited to the destination account.

A process that is able to back out the partial updates of all inflight transactions is able to put the secondary copy in condition for resuming normal operation. The time that is required to perform this back out process should be within all pertinent RTO and the earliest point in time at which a transaction is backed out should be within all pertinent RPO.

2. Point-In-Time Copying

Any of several online-copy techniques may be used to obtain a copy of information that is consistent at some prescribed point in time. According to a "time zero copy" technique, applications are quiesced to prevent any writing activities to the information to be copied, the copy process from primary to secondary data recording devices is started, the applications may be resumed if desired and, if they are restarted, the before-update contents of all subsequent write activities is stored so that the before-update contents can be included in the copy that is being made. This technique obtains a consistent copy at the time the applications were quiesced when the copy process was started.

According to a "time one copy" technique, the copy process from primary to secondary data recording devices is started while applications are active and possibly updating the information that is being copied, an indication of all information that is changed after the copy process was started is stored and, when the full extent of the information to be copied has been copied, applications are quiesced to prevent any further writing activities while the changed information is written to the secondary data recording device. This technique obtains a consistent copy at the time the applications were quiesced when the copy process was nearly finished.

Both of these techniques are unattractive because each requires at least a brief outage when the applications are quiesced.

3. Real-Time Copying

Other online-copy techniques may be used to obtain a copy of information without quiescing the applications. Several are described below.

a) Synchronous Remote Copy

Examples of synchronous techniques for obtaining a remote copy are disclosed in U.S. Pat. Nos. 5,544,347 and 5,734,818, both of which are incorporated herein by reference. Synchronous techniques receive write commands from a computer and confirm the successful recording of new information on the primary data recording device and the secondary data recording device before acknowledging to the computer that the write command has been completed. If the primary and secondary data recording devices are separated by any appreciable distance, the need to confirm recordation on both devices incurs an extremely long wait and the computer application suffers a huge penalty in performance. In addition, it is difficult to maintain remote synchronization for multiple write activities across multiple devices and controllers if a related write activity fails on one device.

b) Asynchronous Extended Remote Copy

Examples of asynchronous techniques for obtaining a remote copy are also disclosed in U.S. Pat. Nos. 5,544,347 and 5,734,818, cited above. Asynchronous techniques allow better system performance because only the successful recording of new information on the primary data recording device is required before acknowledging to the computer that a write command has been completed. Unfortunately, significant computer system resources are required to provide "data mover" functions for moving data and other information between primary and secondary controllers. Although asynchronous remote copy techniques using data mover functions provide extremely high data integrity, the additional expense required for the additional computer hardware and software make this technique costly.

c) Semi-Synchronous Remote Copy

Examples of semi-synchronous techniques for obtaining a remote copy are disclosed in U.S. Pat. No. 5,742,792, which is incorporated herein by reference. Semi-synchronous techniques receive write commands from a computer and confirm the successful recording of new information on only the primary data recording device before acknowledging to the computer that the write command has been completed. The primary data recording device presents a "device busy" status until the recordation of information on the secondary data recording device is confirmed. This technique guarantees the remote copy is synchronized before processing another write command for that device. Although system performance is better than that provided by synchronous techniques, it is not as good as that provided by asynchronous techniques for widely separated primary and secondary controllers. In addition, it is extremely difficult to maintain remote synchronization for multiple write activities across multiple devices and controllers if a related write activity fails on one device.

C. Unfulfilled Needs

The need remains for a technique that can perform point-in-time copying of data files and databases without requiring the quiescing of associated applications, and that can perform real-time copying of data files and databases while simplifying the task and reducing the cost of maintaining remote copy synchronization for multiple write activities across multiple devices and controllers if a related write activity fails on one device. The technique should be cost-effective, avoid the need for even brief outages of applications during normal operations, and facilitate the task of system recovery to meet the requirements of demanding RTO and RPO.

DISCLOSURE OF INVENTION

It is an object of the present invention to simply the task of maintaining remote copy synchronization across multiple data recording devices and controllers, to improve the availability of applications, and to reduce the time and/or resources required to restore application processing after a disaster or other abnormal event.

In accordance with one aspect of the present invention, a method for controlling a transfer of information between a first storage system and a second storage system comprises the first storage system receiving a suspend command and a prospective suspend time; the first storage system receiving a first data-write command and, in response, recording first information on a first information storage medium and either sending a second data-write command that corresponds to the first data-write command to a second storage system for recording second information corresponding to the first information on a second storage medium if the suspend time has not yet passed, or storing one or more identifiers of information recorded on the first storage medium by the first data-write command if the suspend time has passed.

In accordance with another aspect of the present invention, a method for controlling a transfer of information between a first storage system and a second storage system comprises obtaining a prospective suspend time; before the suspend time, the first storage system receiving one or more first commands and, in response, recording information on a first storage medium and sending one or more second commands to cause the second storage system to record corresponding information on a second storage medium; and after the suspend time, the first storage system receiving one or more third commands and, in response, recording information on the first storage medium and storing one or more indications of the information recorded on the first storage medium in response to the third commands.

In accordance with a further aspect of the present invention, a data recording system comprises a data recording medium; an information storage device; controlling circuitry coupled to the data recording medium and the information storage device, wherein the controlling circuitry is adapted to receive a suspend command and set a prospective suspend time in response thereto; receive a data-write command and cause data to be recorded on the data recording medium in response thereto; send a signal to an output terminal that represents the data recorded on the data recording medium if the suspend time has not passed; and store information in information storage device that is an indication of the data recorded on the data recording medium in response to the data-write command if the suspend time has passed.

In accordance with yet another aspect of the present invention, a method for controlling a data storage system proceeds according to one of a plurality of operational modes and comprises steps that perform the acts of receiving a data-write command that conveys data to be recorded on a first data recording medium and, in response, either sending a signal to an output terminal that represents the data while operating in a duplexing operational mode or storing in memory an indication of the data while operating in a suspended operational mode; and receiving a suspend command that conveys a prospective suspend time and changing to the suspended operational mode after the prospective suspend time passes.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Overview

Figure 1:
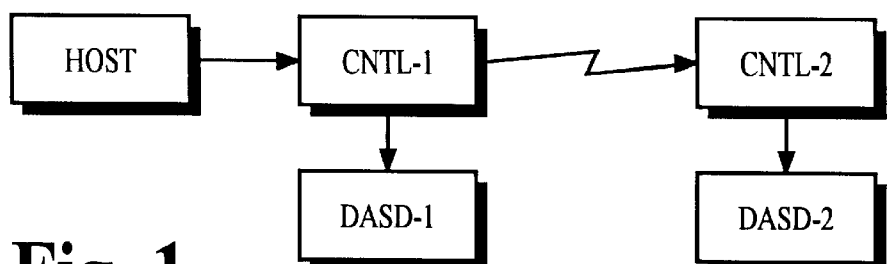
FIG. 1 is block diagram of a host computer, a primary storage controller and primary data recording device, and a secondary storage controller and secondary data recording device.

FIG. 1 illustrates a computer system in which computer HOST sends a variety of commands such as read and write commands to primary controller CNTL-1, which in turn controls the operation of one or more primary data recording devices DASD-1 to read and write information in response to the commands received from computer HOST. A communication link conveys information between primary controller CNTL-1 and secondary controller CNTL-2 so that a remote copy of the information recorded on data recording devices DASD-1 can be recorded on one or more secondary data recording devices DASD-2 that are controlled by secondary controller CNTL-2.

The computer HOST may be essentially any type of information processing machine including so called mainframe computers, mini-computers and micro-computers. Examples of mainframe computers include the Skyline series of Hitachi Data Systems, Inc., Santa Clara, Calif. described in "Skyline Series Functional Characteristic," document number FE-95G9010, which is incorporated herein by reference.

Each primary data recording device DASD-1 and secondary data recording device DASD-2 may be essentially any type of direct-access data recording device using any type of data recording technology such as magnetic and optical technologies. Primary controller CNTL-1 and secondary controller CNTL-2 may be essentially any devices that are suitable for controlling the operation of the data recording devices. An example of a direct access storage device and suitable controller that may be used with the mainframe computers mentioned above is the model 7700E storage subsystem of Hitachi Data Systems, Inc., described in "Hitachi Freedom 7700E User and Reference Guide," document number BO-98DD845, which is incorporated herein by reference.

The communication link between the primary and secondary controllers may comprise essentially any combination of metallic conductors, optical fibers, terrestrial or satellite radio-frequency communication paths or other communicating technology. The total end-to-end length of the link may be of any desired size. For example, primary controller CNTL-1 and secondary controller CNTL-2 may be located in the same room or they may be separated by thousands of kilometers.

The block diagram shown in FIG. 1 as well as the block diagrams shown in other figures do not illustrate a number of components and features that may be important in practical computer systems. For example, mainframe computers and disk controllers are often connected by multiple high speed channels and associated adapters or interface circuitry. Disk controllers for use in mainframe systems typically comprise multiple data paths for concurrent input/output operations and also include components for decoding device addresses. Similarly, data recording devices in mainframe systems typically include one or more read/write head assemblies and components for controlling the sequence of input/output commands that are passed to the head assemblies so that a data recording medium may be accessed in some optimal manner. Still other components may provide status and diagnostic information and may be used for remote problem diagnosis and repair. These features are not critical to practice the present invention and are omitted from the figures for illustrative clarity.

Furthermore, for the sake of illustrative clarity, secondary controller CNTL-2 is not shown connected to any computer. Generally, disk controllers adapted to operate with mainframe computers cannot stand alone but require a connection to a computer. This connection may be realized in a number of ways. Two ways are mentioned briefly. According to one way, secondary controller CNTL-2 is connected to computer HOST by way of some communication link not shown. This communication link may be associated with or be independent of the communication link between primary controller CNTL-1 and secondary controller CNTL-2. According to a second way, secondary controller CNTL-2 may be connected to a second computer not shown in the figure. If a second computer is available, it may be used with secondary controller CNTL-2 to provide a more complete backup system for computer HOST and controller CNTL-1.

1. Duplexing

The diagram shown in FIG. 1 represents a system operating in "duplexing" mode, in which information is transmitted from primary controller CNTL-1 to secondary controller CNTL-2 so that the remote copy on secondary data recording devices DASD-2 may be kept in synchronization with the information stored on primary data recording devices DASD-1.

2. Suspended

Figures 2A, 2B:
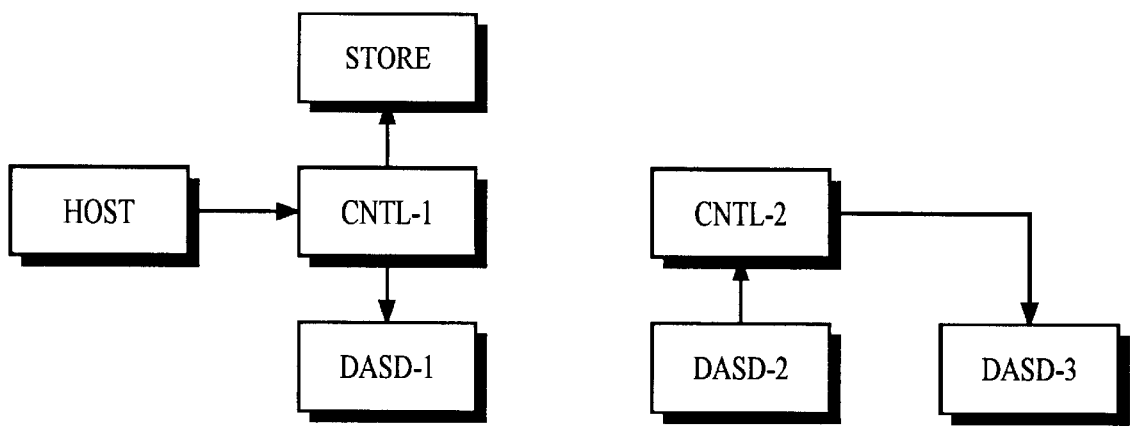
FIG. 2A is block diagram of a host computer, a primary storage controller, information storage device and primary data recording device.
FIG. 2B is block diagram of a secondary storage controller connected to secondary and tertiary data recording devices.

The diagram shown in FIG. 2A represents a computer system operating in a "suspended" mode, in which information is not transmitted from primary controller CNTL-1 to secondary controller CNTL-2 to keep the remote copy on secondary data recording devices DASD-2 in synchronization. As a result, the remote copy is allowed to become increasingly out of date as subsequent commands received from computer HOST cause information recorded on primary data recording devices DASD-1 to be changed. Some indication of the changed information that occurs as a result of these subsequent commands is stored in information storage device STORE. In preferred embodiments, information storage device STORE is non-volatile random access memory (RAM). This device is sometimes referred to as a "cache" for some implementations of controllers.

3. Optional Shadow Copying

The diagram shown in FIG. 2B represents an optional mode of operation in which secondary controller CNTL-2 operates in a mode that obtains a shadow copy of the remote copy stored on secondary data recording devices DASD-2. The shadow copy is written onto tertiary data recording devices DASD-3. This mode of operation may be used whenever the computer system is operating in a "suspended" mode and the remote copy that is recorded on secondary data recording devices DASD-2 is known to be consistent. Upon completion of this copy operation, the information recorded on tertiary data recording devices DASD-3 will represent the latest consistent remote copy of the information that is recorded on primary data recording devices DASD-1.

4. Pending

Figure 3:
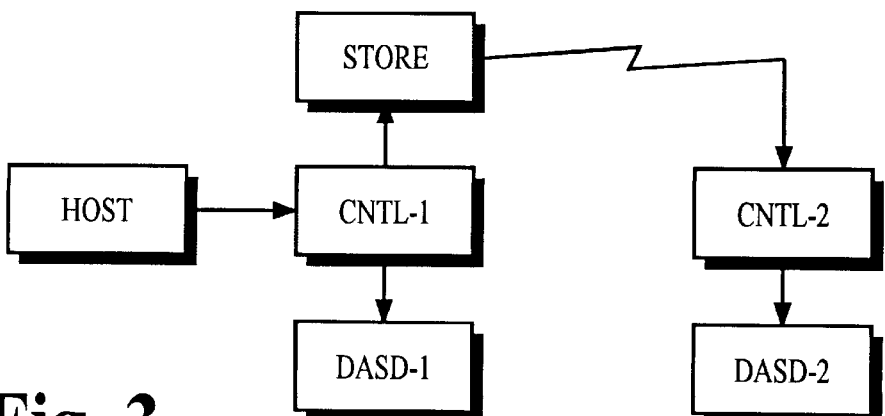
FIG. 3 is block diagram of a host computer, a primary storage controller, information storage device and primary data recording device, and a secondary storage controller and secondary data recording device.

The diagram shown in FIG. 3 represents a computer system operating in a "pending" mode in which the indications stored in information storage device STORE are used to send to secondary controller CNTL-2 changed information recorded on data recording devices DASD-1. This changed information has caused the remote copy on secondary data recording devices DASD-2 to become out of synchronization with the information recorded on primary data recording devices DASD-1. The figure shows a communication link between information storage device STORE and secondary controller CNTL-2 to more clearly represent the fact that the information passed to secondary controller CNTL-2 corresponds to the indications of changed information stored in information storage device STORE. In an actual embodiment, however, it is anticipated that this communication link is the same link as that shown in FIG. 1.

When all of the changed information that corresponds to the indications stored in information storage device STORE has been sent to secondary controller CNTL-2, the remote copy on secondary data recording devices DASD-2 will be synchronized with the information recorded on the primary data recording devices DASD-1. The computer system may then operate in the "duplexing" mode discussed above and represented in FIG. 1.

B. Operating Modes

The present invention provides a prospective suspend feature that permits a consistent remote copy to be obtained for information recorded on any number of primary data recording devices DASD-1 that are controlled by essentially any number of primary controllers CNTL-1. This prospective suspend feature may be used with essentially any type of device implementations and configurations.

According to the present invention, computer HOST may operate with primary controller CNTL-1 and primary data recording devices DASD-1 as if no remote copy or duplexing feature is present.

In response to write commands received from computer HOST, primary controller CNTL-1 causes information to be written to primary data recording devices DASD-1. When the information has been written successfully, primary controller CNTL-1 returns an acknowledgement (Ack) informing computer HOST that the write completed successfully. Alternatively, primary controller CNTL-1 may operate in a "fast-write mode" in which write commands are stored in non-volatile storage and an acknowledgement is returned to computer HOST as soon as the command is stored. The actual write to primary data recording device DASD-1 is performed later.

Primary controller CNTL-1 may operate in any of several modes.

1. Duplexing Mode

While operating in "duplexing" mode, primary controller CNTL-1 sends information about the write command to secondary controller CNTL-2, which is used to make a corresponding update to information recorded on secondary data recording device DASD-2. In one embodiment, the information sent to secondary controller CNTL-2 is in the form of an update information descriptor (UID) that specifies a time stamp (TS), a controller identifier, a data recording device identifier, the track number or record number on the device that is affected by the write command, and the information to be written to the data recording device. The UID uniquely identifies the location and content of the information to be written and the system time when the corresponding write command was issued by the host computer. If the computer is part of a multi-processor complex, the time stamp is provided by a clock that is shared by all of the processors in the complex.

For ease of discussion, the term "UID" is used herein to describe the update information that primary controller CNTL-1 sends to secondary controller CNTL-2 even though other forms and content of information may be used.

Secondary controller CNTL-2 receives the UID and causes the appropriate secondary data recording device DASD-2 to record the appropriate information at the appropriate location on that device. When the write has completed, secondary controller CNTL-2 sends an acknowledgement to primary controller CNTL-1 indicating the write to secondary data recording device DASD-2 was successful. Alternatively, secondary controller CNTL-2 may operate in a fast-write mode by acknowledging that the update for the write command has been stored and will be carried out later.

If the update to secondary data recording device DASD-2 cannot be completed successfully, secondary controller CNTL-2 may send a negative acknowledgement (Nak) to primary controller CNTL-1. In addition, primary controller CNTL-1 may assume a negative acknowledgement if a positive acknowledgement is not received within some period of time.

2. Suspended Mode

Primary controller CNTL-1 initiates the suspended mode of operation at a time specified in a "suspend" command received from computer HOST. The suspend command specifies a prospective or future suspend time (TP).

As mentioned above, the use of a prospective suspend permits a system to obtain a consistent remote copy for information recorded on any number of primary data recording devices DASD-1 that are controlled by essentially any number of primary controllers CNTL-1. Computer HOST, or a multi-processor complex, selects a prospective suspend time that is far enough into the future that there is sufficient time to notify all primary controllers that need to be notified. Thereafter, write commands sent to each primary controller are handled in the same fashion as that described above for the duplexing mode of operation until the prospective suspend time passes.

After the suspend time passes, each affected primary controller CNTL-1 begins operating in the suspended mode of operation. In this mode, primary controller CNTL-1 responds to each write command received from computer HOST by causing primary data recording device DASD-1 to update recorded information as described above and by storing information in information storage device STORE that indicates the information affected by each write command received while in the suspended mode. Preferably these indications are stored in a non-volatile RAM cache. Primary controller CNTL-1 stops sending UID information to secondary controller CNTL-2. In an alternative embodiment, it also notifies the secondary controller that a suspended mode of operation has begun.

In one embodiment, the indication of updated information that is stored in information storage device STORE is a bit map showing which tracks have been updated while operating in suspended mode. Alternatively, the bit map may show which cylinders contain tracks that have been updated.

3. Pending Mode

The pending mode is a transitional mode of operation from suspended mode to duplexing mode. It is initiated by primary controller CNTL-1 in response to a command received from computer HOST requesting that duplexing mode be resumed. This request may be in the form of a "resume" command, for example.

In response to the request, primary controller CNTL-1 determines whether information storage device STORE is currently storing any indications of updated information. In the embodiments discussed above, this may be done by examining the bit map to determine if any bits are set, indicating which track or cylinder contains updated information that is not included in the remote copy on secondary data recording device DASD-2.

If information storage device STORE currently stores no indication, primary controller CNTL-1 may begin operating in the duplexing mode. In addition, the primary controller may also notify the secondary controller that duplexing operation has resumed.

If information storage device STORE does store one or more indications of updated information, primary controller CNTL-1 constructs for each indication a UID that represents the corresponding track or cylinder and sends the UID to secondary controller CNTL-2. The indication is also removed from information storage device STORE. Secondary controller CNTL-2 and secondary data recording device DASD-2 respond to the UID in the same manner as described above for the duplexing mode of operation.

Write requests that are received from computer HOST during pending mode may be handled in either of two ways. It may be handled in the same manner as described above for the suspended mode or it may be handled as described above for the duplexing mode. Alternatively, the two ways may be selected adaptively. For example, if the write command affects information in a track or cylinder that is represented by an indication stored in information storage device STORE, it may be handled as if in suspended mode, otherwise, it is handled as if in duplexing mode.

When all indications have been removed from information storage device STORE, primary controller CNTL-1 may begin operating in duplexing mode.

4. Simplexing Mode

In simplexing mode, primary controller CNTL-1 and secondary controller CNTL-2 are essentially disconnected from one another. Primary controller CNTL-1 and primary data recording devices DASD-1 may operate as if no duplexing or remote data copy features are present. Computer HOST need not be aware of the disconnection.

5. Failed Mode

The failed mode of operation indicates that something is not working correctly. For example, if primary controller CNTL-I receives a negative acknowledgement from secondary controller CNTL-2 or fails to receive a positive acknowledgement within a period of time, primary controller CNTL-1 may initiate the failed mode of operation and terminate any duplexing operation. Preferably, computer HOST is notified of the failed condition.

An automatic recovery from the failed mode is possible. One way in which this may be done is described below.

C. Post-Processing

As mentioned above, if some failure or other event should require the remote copy recorded on data recording devices DASD-2 to be used, some type of post-processing may be required to back out incomplete transactions. The present invention provides a remote copy that is known to be consistent but there is no assurance that the information contained in the remote copy is logically complete in terms of transactions.

Essentially any process for backing out incomplete transactions may be used. Back out processes that require the use of transaction journals may be provided with journals that are stored in the remote copy and are, therefore, known to be consistent with the associated data files and databases.

D. Optional Shadow Copy

Unless some protective measure is taken, the remote copy recorded on secondary data recording devices DASD-2 is vulnerable to corruption if primary controller CNTL-1, the communication link or some other associated devices should fail while operating in the pending or duplexing mode. Such a failure could cause an abrupt termination in processing that updates information on secondary data recording devices DASD-2.

One way in which this vulnerability can be covered is to occasionally make a shadow copy of the remote copy recorded on secondary data recording devices DASD-2. This can be done safely while the primary controller CNTL-1 operates in suspended mode.

Preferably, primary controller CNTL-1 notifies secondary controller CNTL-2 when suspended mode is initiated and when duplexing mode is to be resumed so that the shadow copy can be scheduled properly. Preferably, primary controller CNTL-1 will also refrain from resuming duplexing mode unless it has received an acknowledgement from the secondary controller CNTL-2.

Figure 5:
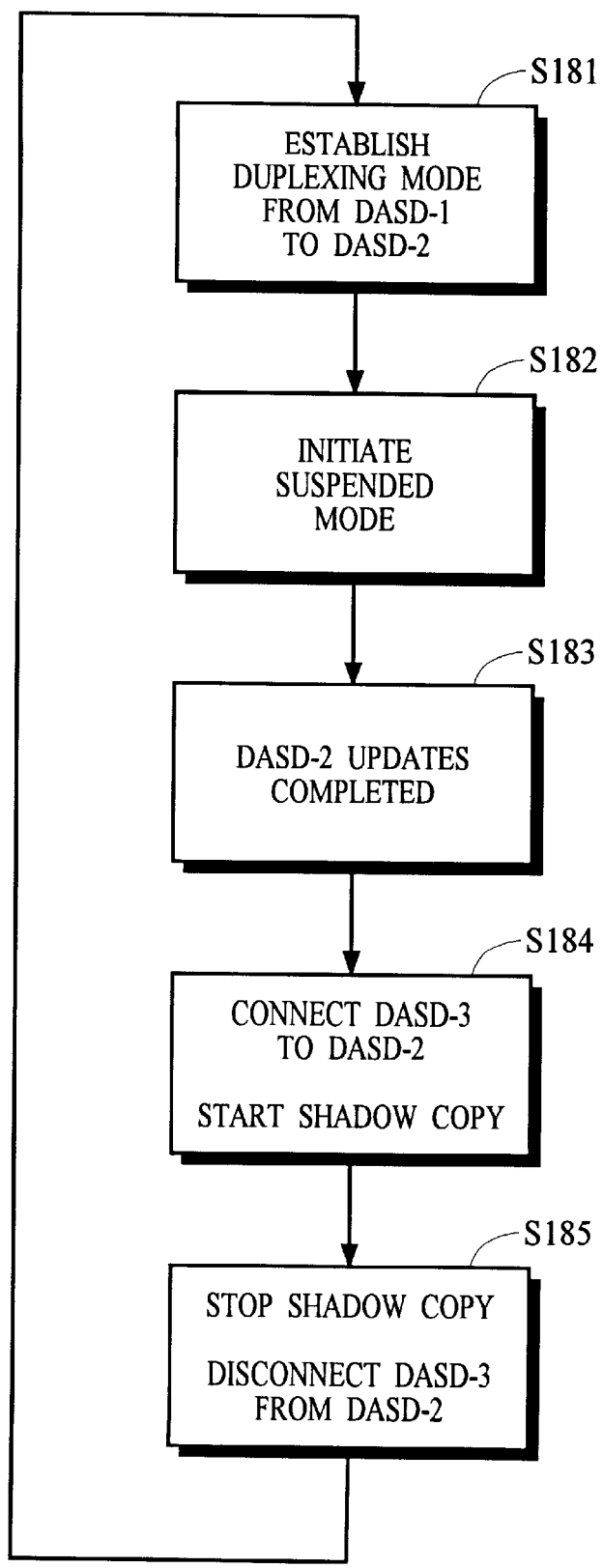
FIG. 5 is a flow diagram of a method for scheduling a shadow copy of a consistent remote copy.

One method for scheduling a shadow copy is illustrated in FIG. 5. According to this method, step S181 establishes a duplexing operational mode for recording information recorded on primary data recording devices DASD-1 onto secondary data recording devices DASD-2. Step S182 initiates a suspended mode. Step S183 checks the status of secondary data recording devices to ensure all update requests received from primary controller CNTL-1 are completed. At this point, the information stored on secondary data recording devices DASD-2 is consistent.

Step S184 connects tertiary data recording devices DASD-3 to secondary data recording devices DASD-2 and initiates a shadow copy process from secondary data recording devices DASD-2 to tertiary data recording devices DASD-3. Step S185 terminates the shadow copy process and disconnects tertiary data recording devices DASD-3 from secondary data recording devices DASD-2. This step may be done when the shadow copy process has completed or it may be done at any other time that is desired. For example, the shadow copy process can be terminated in response to notification received from primary controller CNTRL-1 that duplexing mode is to be resumed.

After step S185 completes and the disconnection is complete, the method may continue with step S181 that establishes a duplexing mode of operation for primary data recording devices DASD-1 and secondary data recording devices DASD-2.

E. Control Method
1. Basic Method

Figure 4A:
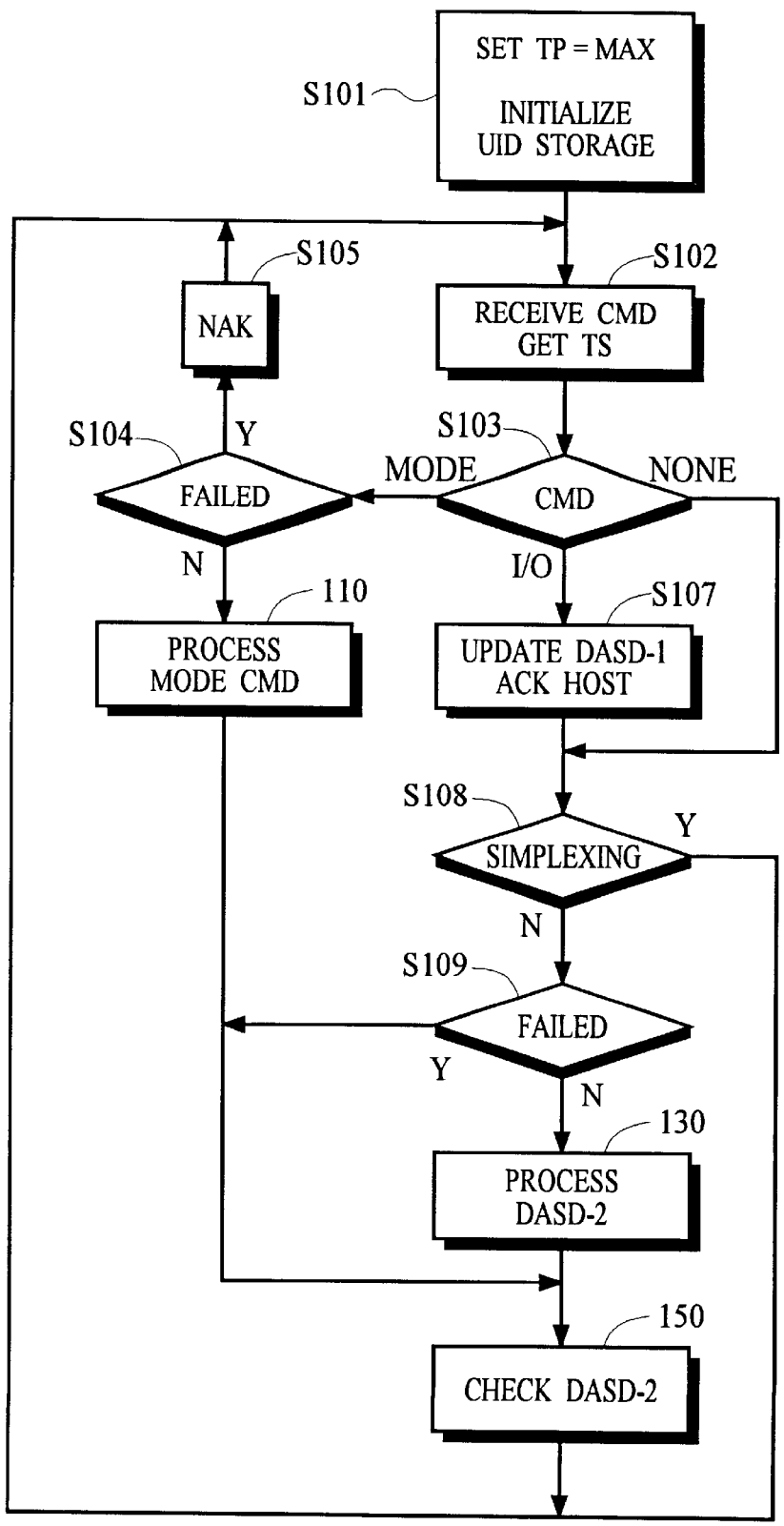
FIGS. 4A through 4D are flow diagrams for one method that may be used to carry out several aspects of the present invention.

One method 100 for carrying out various aspects of the present invention is illustrated in FIGS. 4A through 4D. Referring to FIG. 4A, step S101 initializes method 100 by setting prospective suspend time TP to some maximum value and by initializing a UID store to contain no UID entries. Step S102 receives a command from a computer, if any commands are available. Step S103 determines whether a command was received and, if so, whether the command is a "mode command" requesting a switch in operating modes or an "I/O command" requesting information be written to a data recording device.

If a mode command is received, step S103 continues with step S104, which determines if the controller is operating in the failed mode. If it is, step S105 sends a Nak to the computer and the method returns to step S102. If the controller is not operating in the failed mode, method 100 continues with the execution of process 110, which processes the mode command. This process is discussed in further detail below. Following this process, method 100 continues with process 150 described below.

If an I/O command is received, step S103 continues with step S107, which updates the primary data recording devices accordingly. The method continues with step S108.

If no command is received, step S103 bypasses step S107 and continues with step S108.

Step S108 determines whether the primary controller is operating in simplexing mode. If it is, method 100 returns to step S102. If not, step S109 determines if the primary controller is operating in failed mode. If it is, method 100 continues with process 150, which checks the status of the secondary subsystem. The secondary subsystem includes the secondary controller and associated data recording devices. If the primary controller is not operating in failed mode, method 100 continues with process 130, which processes information for the secondary subsystem, and then continues with step 150. Processes 130 and 150 are discussed below.

2. Process Mode Commands

Figure 4B:
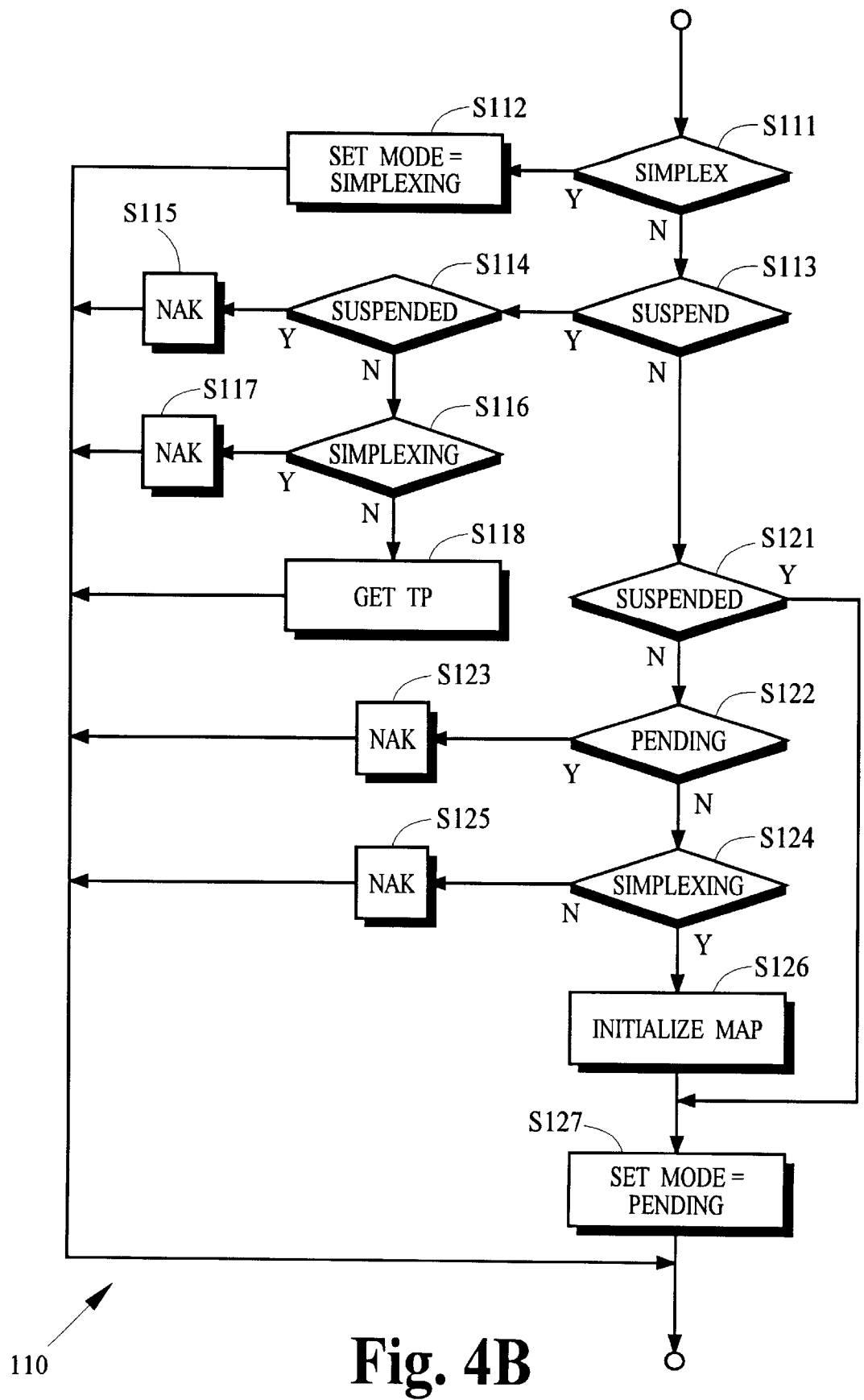

Process 110 for processing mode commands is illustrated in FIG. 4B. Process 110 begins with step S111, which determines whether the mode command just received requests a switch to the simplexing mode. If it does, step S112 sets the mode to simplexing and process 110 terminates, allowing method 100 to continue with process 150. If it does not request a switch to the simplexing mode of operation, step S113 determines whether the mode command just received requests a switch to the suspended mode.

If the command is a request for suspended mode, step S114 determines if the operating mode is already suspended. If it is, step S115 sends a Nak to the computer indicating the error. If the current mode is not suspended, step S116 determines whether the current mode is simplexing. If it is, step S117 sends a Nak to the computer indicating the error.

If step S116 determines that the current operating mode is not simplexing, then the current operating mode must be either duplexing or pending. Step S118 obtains the prospective suspend time TP from the suspend command and process 110 terminates.

If step S113 determines that the mode command is not a suspend command, the mode command must be a resume command. Step S121 determines whether the current operating mode is suspended. If it is not, step S122 determines whether the current operating mode is pending. If it is, step S123 sends a Nak to the computer indicating the error. If the current mode is not pending, step S124 determines whether the current operating mode is simplexing. If it is not, the current operating mode must be duplexing and step S125 sends a Nak to the computer indicating the error.

If step S124 determines that the current operating mode is simplexing, step S126 initializes a map in UID storage indicating that all tracks or cylinders in the primary subsystem must be copied to the secondary subsystem and step S127 sets the current operating mode to pending.

If step S121 determines that the current operating mode is suspended, step S127 sets the current operating mode to pending. Following step S127, process 110 terminates.

3. Process Updates for Secondary Subsystem

Figure 4C:
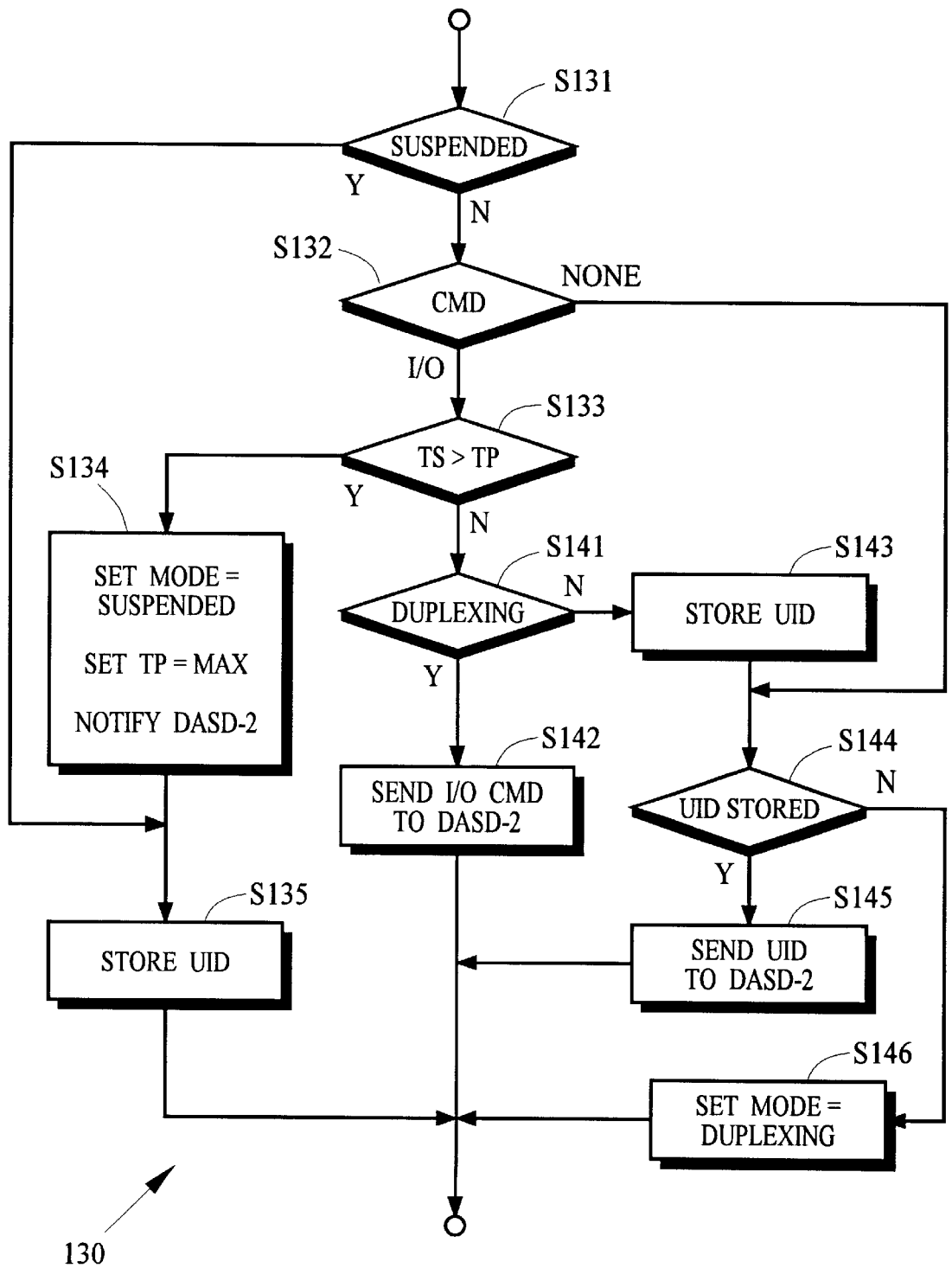

Process 130 for processing I/O commands to the secondary subsystem is illustrated in FIG. 4C. Process 130 begins with step S131, which determines whether the current operating mode is suspended. If it is, step S135 stores an appropriate UID in storage and process 130 terminates, allowing method 100 to continue with process 150.

If the current operating mode is not suspended, step S132 determines whether step S102 received a command. If it did, step S133 determines whether the time stamp TS for the latest command is greater than the suspend time TP. If it is, step S134 sets the operating mode to suspended, resets the suspend time TP to a maximum value, and notifies the secondary subsystem that the primary controller has just initiated the suspended mode. Step S135 stores an appropriate UID in storage and process 130 terminates.

If step S133 determines that the time stamp TS for the latest command is not greater than suspend time TP, this condition may arise for either of two situations: (1) suspend time TP is set to some maximum value, which means no suspend command is pending; or (2) suspend command is pending but the suspend time TP has not yet passed. In either situation, step S141 determines whether the current operating mode is duplexing. If the current mode is duplexing, step S142 sends an appropriate I/O command to the secondary subsystem so that information recorded on a secondary data recording device can be updated. Process 130 then terminates.

If step S141 determines that the current operating mode is not duplexing, then the current operating mode must be pending. Step S143 stores an appropriate UID in storage and step S144 confirms that a UID was just stored by continuing with step S145, which sends information corresponding to the UID to the secondary subsystem and removes the associated UID from storage. Process 130 then terminates.

If step S132 determines that no command was received by step S102, then step S144 determines whether any UIDs are stored. If so, step S145 sends information corresponding to the UID to the secondary subsystem and removes the associated UID from storage. Process 130 then terminates. If no UID is stored, step S146 sets the operating mode to duplexing.

4. Check Status of Secondary Subsystem

Figure 4D:
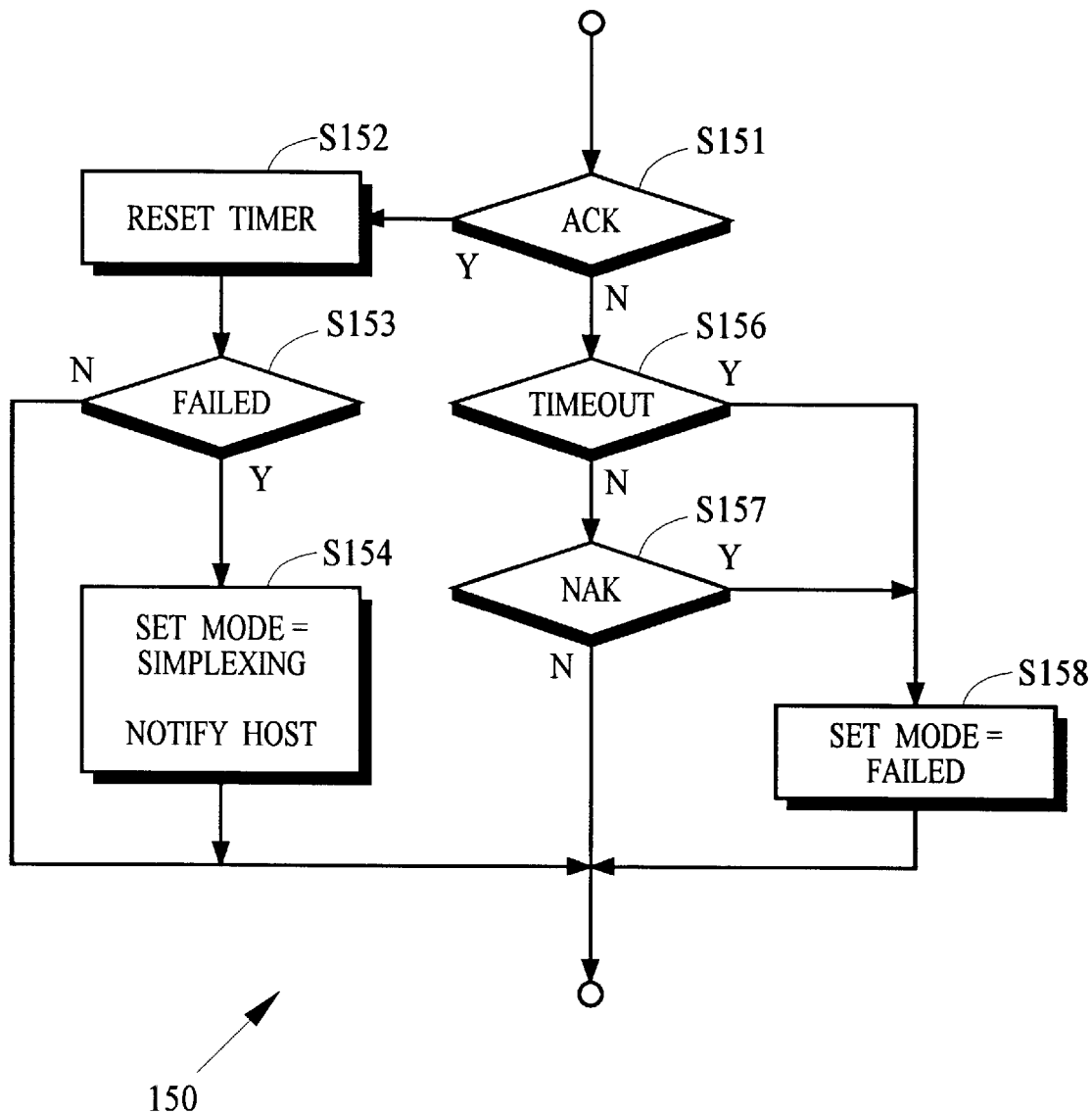

Process 150 for checking the status of the secondary subsystem is illustrated in FIG. 4D. Process 150 begins with step S151, which determines whether an Ack has been received from the secondary subsystem. If so, step S152 resets a timer and step S153 determines whether the current operating mode is failed. If not, process 150 terminates and method 100 continues with step S102. If the current operating mode is failed, step S154 sets the current operating mode to simplexing and the computer is notified that the condition that caused an earlier failure has been corrected.

If step S151 determines that no Ack has been received from the secondary subsystem, step S156 determines whether the timer has timed out. If it has, step S158 sets the current operating mode to failure and process 150 terminates. Optionally, step S158 could also notify the computer of the failure condition.

If the timer has not yet timed out, step S157 determines whether a Nak was received from the secondary subsystem. If not, process 150 terminates. If a Nak has been received, step S158 sends the current operating mode to failed and process 150 terminates.

5. Variations

Many variations in method 100 are possible and other methods in addition to method 100 may be used to carry out various aspects of the present invention. For example, great variation is possible in the detection of and the handling of error conditions. In addition, other methods and structures may be able to realize efficiencies and performance advantages over the embodiments presented herein. The foregoing are examples that illustrate basic concepts of the present invention.

What is claimed is:

1. A method for controlling a transfer of information between a first storage system and a second storage system, the method comprising:
   the first storage system receiving a suspend command and a prospective suspend time;
   the first storage system receiving a first data-write command and, in response to the first data-write command, recording first information on a first information storage medium and either
      sending a second data-write command that correspond to the first data-write command to a second storage system for recording second information corresponding to the first information on a second storage medium if the suspend time has not yet passed, or
      storing one or more identifiers of information recorded on the first storage medium by the first data-write command if the suspend time has passed;
   the second storage system receiving from the first storage system a notification of the suspend command and, thereafter, sending to a third storage system a representation of information recorded on the second storage medium; and,
   the third storage system storing information on a third storage medium to obtain a representation of information stored on the second storage medium;
wherein the second storage system completes the recording of information on the second storage medium in response to the second data-write command before sending to the third storage system the representation of information recorded on the second storage medium.

2. A method according to claim 1 wherein the first storage system records information on a plurality of first storage media and the second storage system records information on a plurality of second storage media.

3. A method for controlling a transfer of information between a first storage system and a second storage system, the method comprising:
   the first storage system receiving a suspend command and a prospective suspend time;
   the first storage system receiving a first data-write command and, in response to the first data-write command, recording first information on a first information storage medium and either
      sending a second data-write command that correspond to the first data-write command to a second storage system for recording second information corresponding to the first information on a second storage medium if the suspend time has not yet passed, or
      storing one or more identifiers of information recorded on the first storage medium by the first data-write command if the suspend time has passed,
   the first storage system receiving a resume command and, in response to the resume command, sending to the second storage system one or more third data-write commands that correspond to the one or more identifiers; and
   the second storage system receiving the one or more third data-write commands and, in response to the one or more third data-write commands, recording information on the second storage medium that corresponds to information stored on the first storage medium by first data-write commands after the suspend time had passed.

4. A method according to claim 3 that comprises the first storage system;
   sending third data-write commands corresponding to all of the one or more identifiers and, thereafter,
   receiving an other first data-write command and, in response to the other first data-write command, recording first information on the first information storage medium and sending an other second data-write command that correspond to the other first data-write command to the second storage system for recording second information corresponding to the first information on the second storage medium.

5. A data recording system comprising:
   data recording medium;

information storage device;

controlling circuitry coupled to the data recording medium and the information storage device, wherein the controlling circuitry;

receives a suspend command and sets a prospective suspend time in response thereto;

receives a data-write command and causes data to be recorded on the data recording medium in response thereto;

sends a first signal to an output terminal that represents the data recorded on the data recording medium if the suspend time has not passed; and stores an indicator in an information storage device that is an indication of the data recorded on the data recording medium in response to the data-write command if the suspend time has passed;

wherein the controlling circuitry receives a resume command and, in response to the resume command, sends a second signal to the output terminal that represents data recorded on the data recording medium and corresponds to a respective indicator stored in the information storage device.

6. A data recording system according to claim 5 wherein the controlling circuitry;

sends second signals to the output terminal that represent data recorded on the data recording medium and correspond to all of the indicators stored in the information storage device and, thereafter, receives data-write commands and, in response to the data-write commands, causes data to be recorded on the data recording medium and causes third signals to be sent to the output terminal, wherein the third signals represent data recorded on the data recording medium.

7. A method for controlling a data storage system, wherein the method proceeds according to one of a plurality of operational modes and comprises steps that perform the acts of:

receiving a data-write command that conveys data to be recorded on a first data recording medium and, in response to the data-write command, either sending a signal to an output terminal that represents the data white operating in a duplexing operational mode or storing in memory an indication of the data while operating in a suspended operational mode;

receiving a suspend command that conveys a prospective suspend time and changing to the suspended operational mode after the prospective suspend time passes; and receiving a resume command and, in response to the resume command, changing to the duplexing operational mode when the memory stores no indication of the data.

8. A method according to claim 7 that comprises changing to a pending operational mode in response to the resume command if the memory stores one or more indications of the data, sending a signal to the output terminal that represents data corresponding to a respective indication of the data and removing the respective indication from the memory.

* * * * *